United States Patent
Kinch et al.

(10) Patent No.: US 10,891,618 B2
(45) Date of Patent: Jan. 12, 2021

(54) PROTECTING ONLINE PAYMENTS THROUGH ONE-TIME PAYMENT CARDS

(71) Applicant: FAIR ISAAC CORPORATION, Roseville, MN (US)

(72) Inventors: Brian Kinch, Rochford (GB); Derek Dempsey, Birmingham (GB)

(73) Assignee: FAIR ISAAC CORPORATION, Roseville, MN (US)

(*) Notice: Subject to any disclaimer, the term of this patent is extended or adjusted under 35 U.S.C. 154(b) by 260 days.

(21) Appl. No.: 15/826,305

(22) Filed: Nov. 29, 2017

(65) Prior Publication Data
US 2019/0164166 A1 May 30, 2019

(51) Int. Cl.
- G06Q 20/40 (2012.01)
- G06Q 20/38 (2012.01)
- G06Q 20/34 (2012.01)

(52) U.S. Cl.
CPC ..... G06Q 20/40145 (2013.01); G06Q 20/348 (2013.01); G06Q 20/385 (2013.01); G06Q 20/3823 (2013.01); G06Q 20/405 (2013.01); G06Q 20/4018 (2013.01)

(58) Field of Classification Search
CPC ......... G06Q 20/40145; G06Q 20/3823; G06Q 20/348; G06Q 20/4018; G06Q 20/385; G06Q 20/405
See application file for complete search history.

(56) References Cited

U.S. PATENT DOCUMENTS

| | | | | |
|---|---|---|---|---|
| 2011/0265159 A1* | 10/2011 | Ronda | ................... | H04L 9/3263 726/6 |
| 2015/0120471 A1* | 4/2015 | Cooke | ................... | G06Q 20/322 705/16 |
| 2015/0127547 A1* | 5/2015 | Powell | ................. | G06Q 20/385 705/67 |
| 2017/0195319 A1 | 7/2017 | Gerber et al. | | |
| 2017/0337549 A1* | 11/2017 | Wong | ................. | G06F 21/6254 |
| 2018/0025347 A1* | 1/2018 | Tanzil | ................. | G06Q 20/346 705/39 |

FOREIGN PATENT DOCUMENTS

| | | | |
|---|---|---|---|
| KR | 101354388 B1 * | 1/2014 | ........... G06Q 20/401 |
| WO | WO-2015/022651 A1 | 2/2015 | |

OTHER PUBLICATIONS

"What you need to know about virtual credit cards", Alayna Pehrson, Oct. 27, 2017, <https://www.lexingtonlaw.com/blog/credit-cards/what-you-need-to-know-about-virtual-credit-cards.html> (Year: 2017).*

* cited by examiner

*Primary Examiner* — Jay Huang
*Assistant Examiner* — Duan Zhang
(74) *Attorney, Agent, or Firm* — Mintz, Levin, Cohn, Ferris, Glovsky and Popeo, P.C; Michael Van Loy; Paul Brockland

(57) ABSTRACT

A system and method for a secure remote payments process and for generation of one-time only remote payment cards is presented. Use of the one-time payment (OTP) cards can use multi-factor authentication where one factor is a biometric technique. A process can include generating an OTP card number based on a first encryption algorithm, an expiry date, and a security code based on a second encryption algorithm. A purchase amount, and the OTP card information are decrypted by an issuer to approve payment for a remote payment, after which the OTP card is no longer valid.

16 Claims, 4 Drawing Sheets

PROTECTING ONLINE PAYMENTS THROUGH ONE-TIME PAYMENT CARDS

TECHNICAL FIELD

The subject matter described herein relates to remote payment authentication, and more particularly to a system and method for protecting remote payments through one-time payment card tokens.

BACKGROUND

Recent rules and guidelines in the banking industry require strong authentication of payments, particularly remote payments for goods or services using a payment card or account. For instance, guidelines approved by the European Parliament, PSD2, define strong authentication as multi-factor, with each factor being subject to the following caveats: each factor must be mutually independent such that the breach of one does not compromise any others; it should be non-reusable and non-replicable (except for inherence); each factor should be designed in such a way as to protect the confidentiality of the authentication data; and each factor should not be capable of being surreptitiously stolen, e.g. via the Internet.

Such requirements for "strong authentication," as defined above, were determined under the European Banking Authority's SecuRe Pay regulations 2014, which came into force in August 2015. In addition, the requirements of PSD2 also state that, for remote transactions such as digital payments, the security requirements shall go even further, requiring a dynamic link to the amount of the transaction and the account of the payee, to further protect the user by minimizing the risks in case of mistakes or fraudulent attacks.

Conventional means for making remote payments include using a payment card, such as a user entering a credit card or debit card number. Given an ease of a breach of such transactions and an ease with which payment cards can be compromised or stolen, such means often fall short of meeting the rules and guidelines. Some specific concerns that need to be addressed include a "man in the middle attack" (MITM), or variants thereof, such as "man in the browser" (MITB), plus other data harvesting compromises such as phishing or data breaches, whereby a third party intercepts the payment details and changes and repurposes the details of the payment, such as the recipient or amount approved. Accordingly, what is needed is a non-reusable, non-replicable and secure system and method for making remote payments.

SUMMARY

This document describes a system and method for a secure remote payments process and for generation of one-time only on-line payment cards (virtual cards) using multi-factor authentication where one factor is a biometric technique. The biometric technique can include, without limitation, facial recognition, voice recognition, fingerprint matching, iris identification, or other biometric technique. Generation of a 'virtual' card can be based on an amount requested. The one-time card also includes the standard elements associated with payment cards, including card number, expiration date, and card security code (CSC or CV2).

In some aspects, a system and method are disclosed that include associating an amount approved for use with other card details, notably a card number (and by derivation, therefore, the associated Card Security Code) and expiry date, provided with the card to provide an additional layer of security.

In one aspect, a system, method and computer program product includes a process executed by one or more computer processors. The process includes receiving, via a communication network, a request for a one-time payment card based on a payment request by a user for making a payment to a merchant over the communication network. The payment includes an amount in a proposed currency. The request for the one-time payment card is initiated from an institution associated with a bank identification number (BIN) that receives the payment request from the user and approves the amount of the payment, the one-time payment card being represented as a virtual card with one-time payment details. The process further includes authenticating an identity of the user using one or more credentials of the user, and generating a primary account number (AN) associated with the user, the PAN being generated at least in part based on the authenticated identity of the user and the amount approved by the institution. The process further includes generating the one-time payment details of the virtual card associated with the one-time payment card, the one-time payment details comprising a card number including the BIN within the PAN, the last digit of the PAN being a check digit for a payment card validation algorithm used by the merchant, the one-time payment details further comprising an expiry date, the amount of the payment, and a card security code (CV2). The process further includes sending, via the communication network, the card number, the expiry date, the amount of the payment, and the CV2 to the institution for authorization.

Implementations of the current subject matter can include, but are not limited to, systems and methods consistent including one or more features as described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
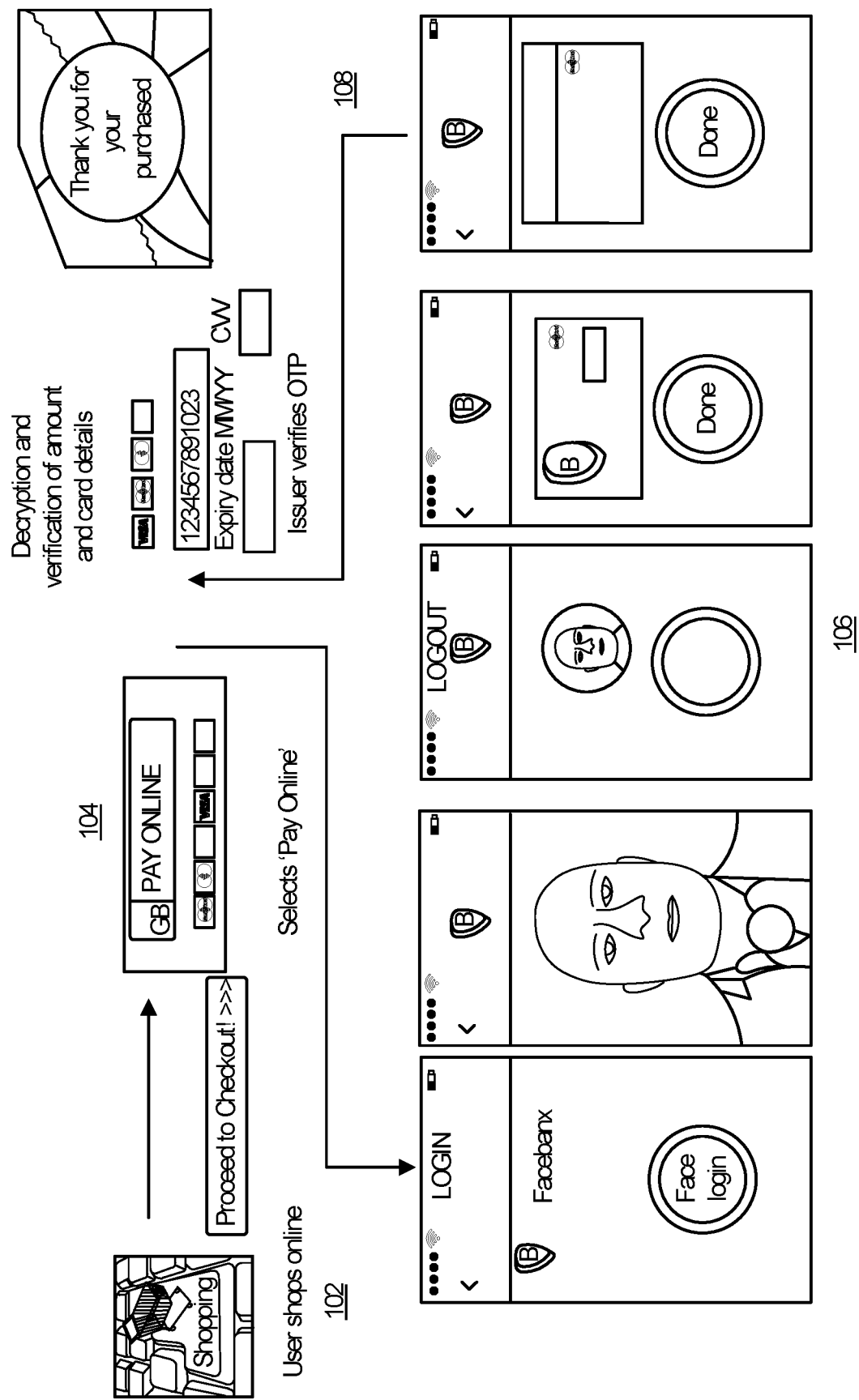
FIG. 1 is a pictorial representation of a user model for generating a one-time payment card, or virtual card.

To address the above and potentially other issues with currently available solutions, this document discloses methods, systems, articles of manufacture, and the like consistent with one or more implementations of the current subject matter to provide a technique that uses an approved amount associated with a card's details to define a one-time payment (OTP) card number that is provided for the card.

In some implementations, a system and method use a number of data elements in order to generate a one-time payment card. In particular, a system and method utilize at least an amount approved, and an issue date of the one-time payment card, both of which can be present at a point of payment card creation and payment authorization. This data can be encrypted by the payment issuer, and a message transmission can utilize a decryption algorithm at the point of authorization, also likely by the payment issuer.

In some implementations of a system and method, the following data elements are provided or generated at a point of payment card authorization: amount approved, issue date, card number, expiry date, and card security code (CV2). In particular, a one-time only card number is generated for each one-time payment. The expiry date is used purely as a token, and must be a valid date with a correct or standard format, such as MM/YY and tenure, but does not attribute this date to the actual expiry of the one-time payment card. The standard constraints of payment card numbers can be applied such that is a simple checksum formula used to validate the card number, such as a Luhn algorithm, can be used.

In some implementations, the Luhn algorithm must be satisfied and the card number structure includes a six-digit Bank Identification Number (BIN), followed by a Primary Account Number (PAN), with the last digit being the check digit for the Luhn algorithm or similar verification algorithm. An association between the amount of the approved payment and the card number can be provided. The one-time payment card is transient and only valid for a defined duration of the transaction. In some aspects, a notional duration of 30 minutes can be defined for the transaction to allow for a delay in proceeding with payment and hence authorization, but the one-time payment card number is essentially a transient object that requires regenerating if not used within the defined duration (i.e. during the transaction). Other durations can be defined, from several seconds to several hours, and can be dependent on the transaction (i.e. monetary amount, type of good or service being paid for, location of merchant, location of purchaser, etc.).

In accordance with some implementations, a system and method for generating a one-time payment card, and for executing a payment transaction using a one-time payment card, includes a process as follows. The one-time payment card is requested by the user for a requested amount, which must be the full value of the purchase in proposed payment currency. The request is initiated by the user through their bank's or nominated third party's on-line banking application so the correct BIN can be allocated. An authentication process establishes the identity credentials of the person making the request. Once authenticated, the PAN number is generated by the bank using an encryption algorithm that is linked to the amount approved. The BIN is assigned based on the bank details provided above.

In some preferred implementations, the complete card number is calculated and generated to conform to the Luhn algorithm or other verification algorithm. If required, the expiry date can also be used as part of the encryption process. The Card Security Code (CV2) is also generated independently from the payment amount. The calculated fields are now included in the payment details. When the one-time payment card is used and the payment details are submitted for authorization the PAN number can be checked using the decrypting algorithm to establish that the amount is correct for this payment. Any of these submissions can use one or more standard cryptographic key protocols. The method proposed is a general method to generate card numbers that are linked to payment amounts.

There may be requirements for fallback arrangements and exception handling in the event of technical or network failures. Fallback arrangements can be defined to allow for system failure such as network issues or system servers being out of commission.

In preferred exemplary implementations, the card number is generated according to the ISO/IEC 7812 approved format, i.e. length up to 19 characters with three parts, a 6-digit BIN, unique account number, and check digit based on the Luhn algorithm. In specific implementations, a 16-digit card number is generated with a 6-digit BIN at the start and a 10-digit PAN (primary account number). The Luhn algorithm check digit is the final number. This structure is preferred since 16 digits is a common card length that is compatible with the majority of processing systems, however the system and method can generate a one-time payment card number of any length or represented by any set of alphanumeric characters.

A checksum validation algorithm such as the Luhn algorithm can restrict the PAN generation such that the penultimate digit is used as a correction digit. Accordingly, in some implementations this means there are 8 digits remaining for use.

The one-time payment card number needs to be a unique value if the card is active. A one-time card is active between its generation and its authorization following user request. Once the one-time payment card has been used and the value redeemed for purchase the number can become available for re-use. In exemplary implementations, a first period, such as 30 minutes for example, can be applied for the card to remain active following issuance. Further, a second period, 24 hours period for example, can be set by the system for card number reuse to allow for the standard settlement process to take place.

The card number as a whole needs to be unique while active. If it is assumed that the BIN will continue to provide issuer identification, therefore the PAN needs to be unique within its lifecycle. Accordingly, in effect, the entire card number is transient.

FIG. 1 is a pictorial representation of a user model for generating a one-time payment (OTP) card, or virtual card, by an OTP computing system. At 102, a user shops online. The online shopping can include a form of electronic commerce that allows users to directly buy goods or services from a seller represented on a webpage over the Internet using a web browser or other application. Users can use one or more of a range of different computers and devices, including desktop computers, laptops, tablet computers and smartphones. At 104, the user, after selecting a product to purchase and possibly designating the product for their virtual "shopping cart" and checkout, selects on the webpage an option to "pay online." Such selection will activate a computer-implemented process, at 106, to generate a one-time payment card with which to use for the purchase.

At 106, a request for the one-time payment card is initiated from an institution associated with a bank identification number (BIN) that receives the payment request from the user and approves the amount of the payment. The one-time payment card is represented as a virtual card with one-time payment details. The process further includes authenticating an identity of the user using one or more credentials of the user, which can include biometric data, and generating a primary account number (PAN) associated with the user. The PAN is generated at least in part based on the authenticated identity of the user and the amount approved by the institution. The process further includes generating the one-time payment details of the virtual card associated with the one-time payment card, the one-time payment details comprising a card number including the BIN and the PAN, the last digit of the PAN being a check digit for a payment card validation algorithm used by the processing system, the one-time payment details further comprising an expiry date, the amount of the payment, and a card security code (CV2). At 108, the OTP card number is sent, via a communication network, to the issuer institution for verification, authorization, and to complete the purchase at 110.

Figure 2:
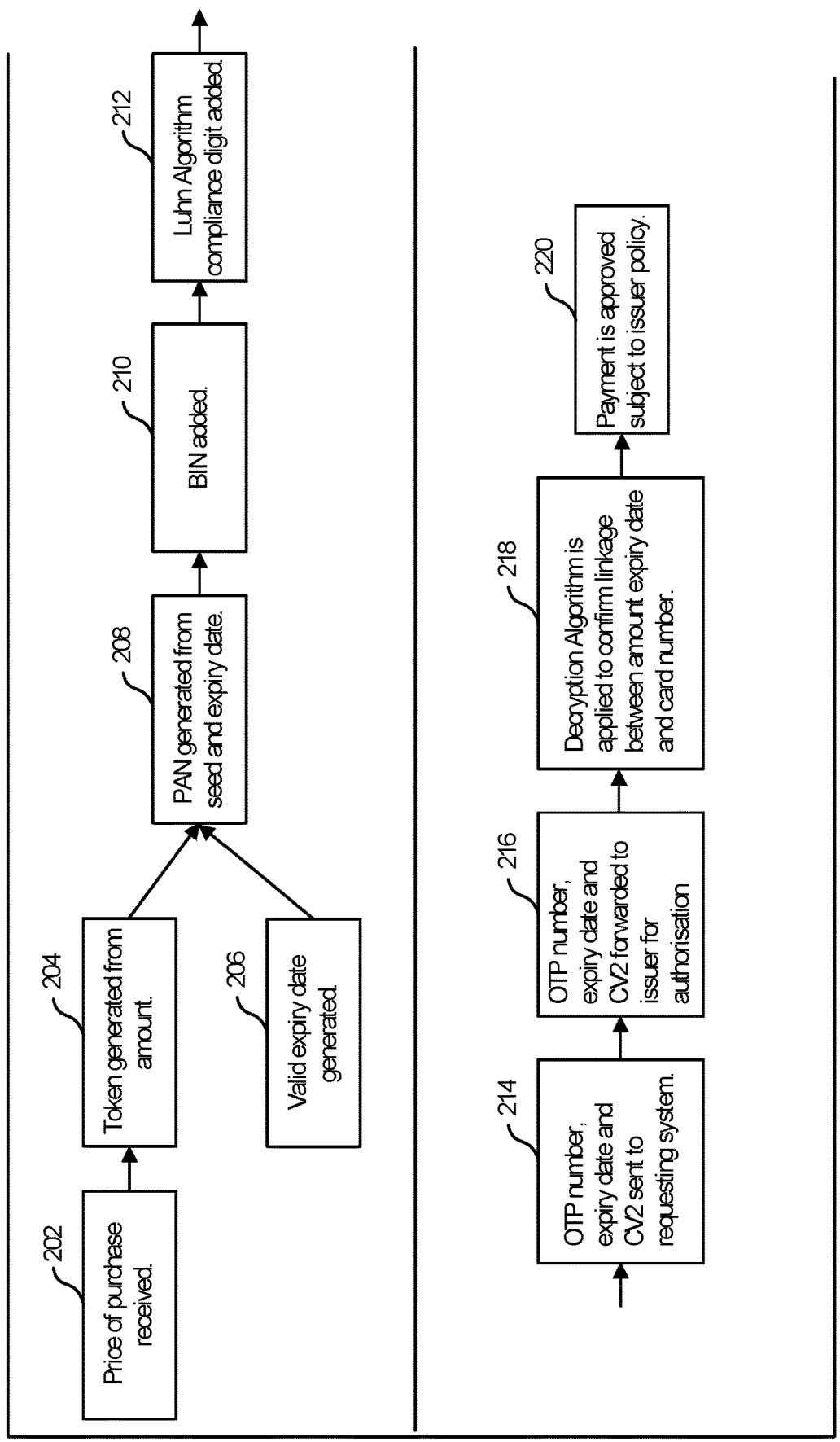
FIG. 2 is a process flow diagram of a method for generating and using a one-time payment card.

FIG. 2 is a basic process flow diagram 200 of a method for generating and using a one-time payment (OTP) card. At 202, a price of a purchase is received by an OTP card computing system from a requesting system. The requesting system can be a point-of-sale (POS) system such as a website for online shopping, a banking institution, or cash register in a physical location, and the price and/or associated purchaser information represent a seed for the OTP card. At 204, a token is generated by the OTP card computing system based on the amount of the purchase. At 206, a valid expiry date for the OTP card is generated by the OTP card computing system. At 208, an individual account number is generated from the seed and the expiry date, and at 210 a BIN is added to the OTP card information. At 212, further digits can be added to the OTP card number to comply with the Luhn algorithm.

At 214, the OTP card number, expiry data, and a card security code (CV2) are encrypted and sent by the OTP card computing system to the requesting system, and at 216 the OTP card number, expiry data, and a card security code (CV2) are forwarded from the requesting system to a payment card issuer or credit-granting institution for authorization. At 218, a decryption algorithm is applied to the OTP card data to confirm linkage between the amount or price, the expiry data, and the OTP card number. Once confirmed, at 220 payment is approved, subject to issuer policy.

Figure 3:
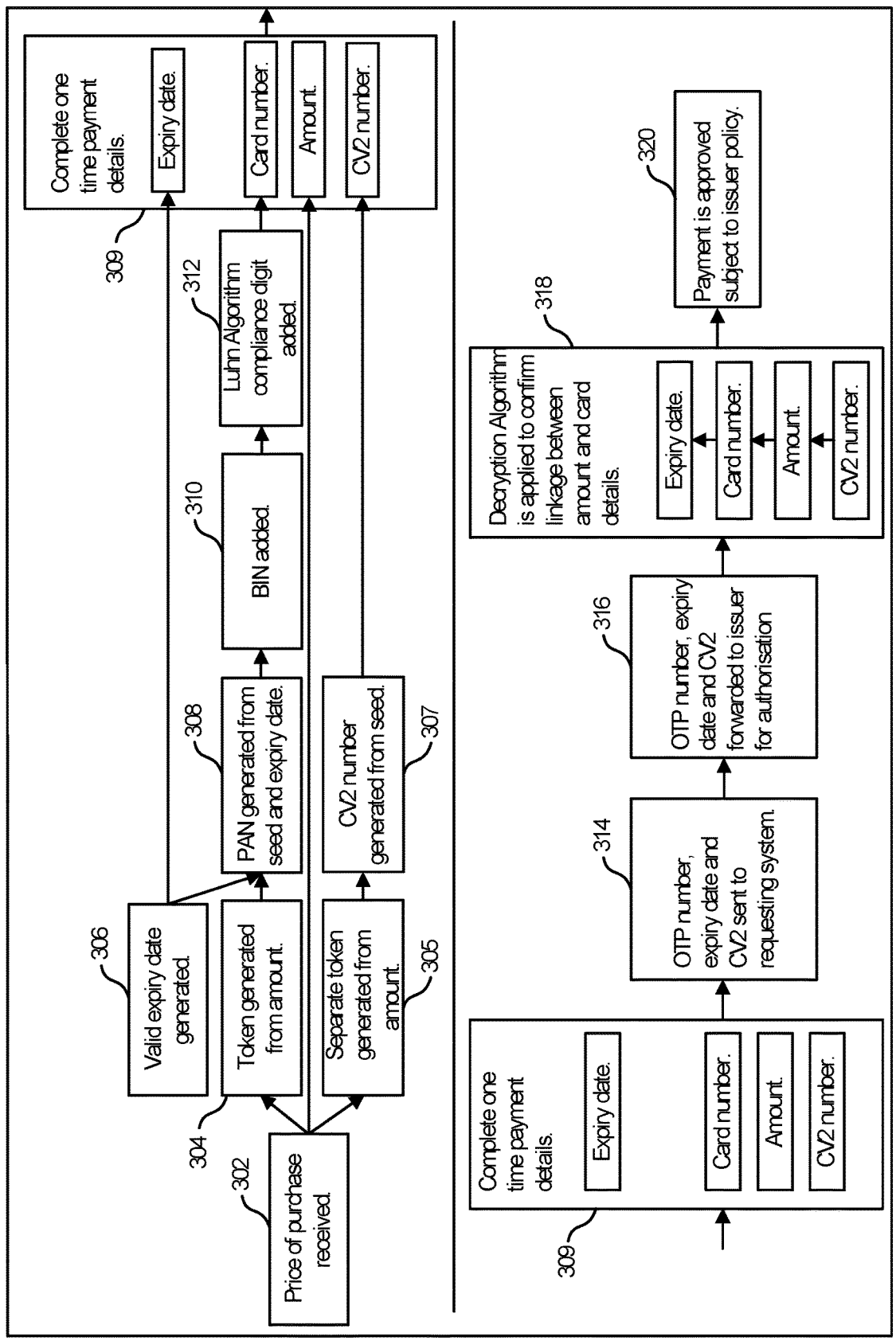
FIG. 3 is a detailed process flow diagram of a method for generating and using a one-time payment card.

FIG. 3 is a detailed process flow diagram 300 of a method for generating and using a one-time payment card. As similarly described above with respect to FIG. 2, at 302, a price of a purchase is received by an OTP card computing system from a requesting system. The requesting system can be a point-of-sale (POS) system such as a website for remote shopping, a banking institution, or cash register in a physical location, and the price and/or associated purchaser information represent a seed for the OTP card. At 304, a token is generated by the OTP card computing system based on the amount of the purchase. At 306, a valid expiry date for the OTP card is generated by the OTP card computing system. At 308, a PAN is generated from the seed and the expiry date, and at 310 a BIN is added to the OTP card information. At 312, further digits can be added to the OTP card number to comply with the Luhn algorithm. However, at 305, after the price of the purchase is received, and when the token is generated, a separate, second token can be generated, preferably using a different encryption algorithm. The CV2 number can be generated based on the seed and using the separate, second token. The result, at 309, is a complete set of OTP card data, including all necessary purchase card information and details, and specifically including expiry date, OTP card number, purchase amount, and CV2 number.

At 314, the OTP card number, expiry data, and a card security code (CV2) are encrypted and sent by the OTP card computing system to the requesting system, and at 316 the OTP card number, expiry data, and a card security code (CV2) are forwarded from the requesting system to a payment card issuer or credit-granting institution for authorization. At 318, a decryption algorithm is applied to the OTP card data completed at 309 to confirm linkage between the amount or price, the expiry data, and the OTP card number, and/or the CV2 number. Once confirmed, at 320 payment for the purchase can be approved, subject to issuer policy.

Figure 4:
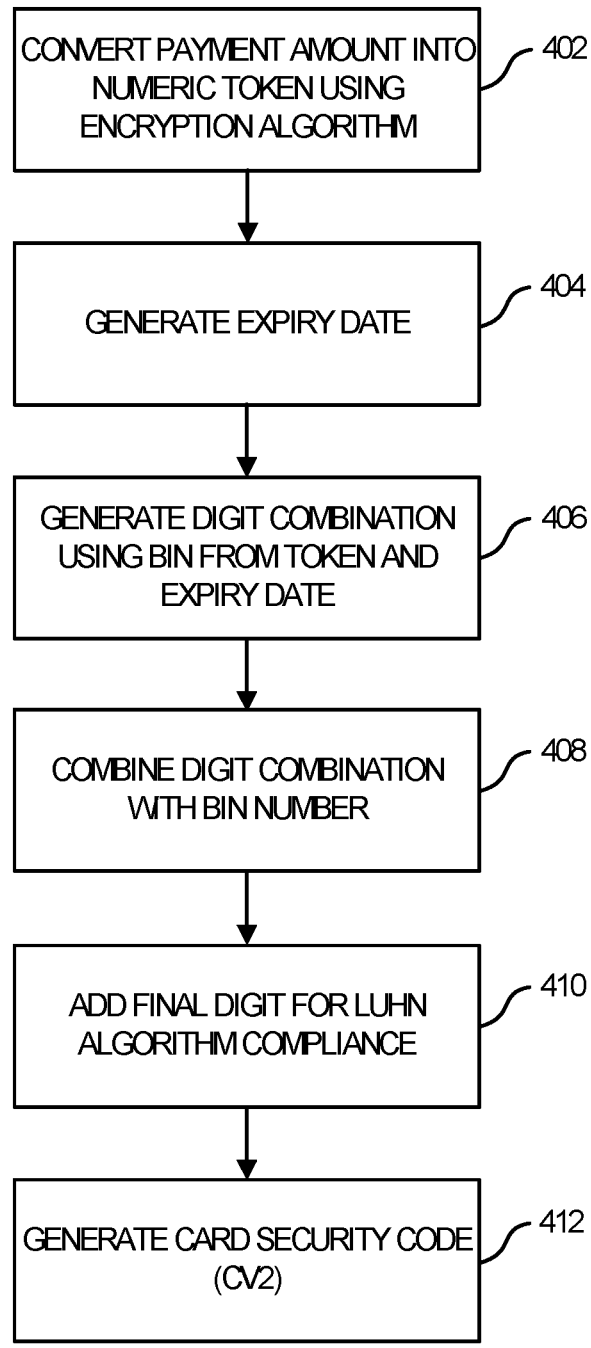
FIG. 4 is a flowchart of a method for encrypting a one-time payment card.

The one-time payment card number can be encrypted, according to a system and method disclosed herein. In some implementations, as shown in FIG. 4, a method 400 of encryption is provided. At 402, the payment amount is converted into a numeric token using any of a number encryption algorithms, such as triple DES, for example. At 404, an expiry date is generated as a date between one and 60 months ahead. This can be generated as a random element or using a separate encryption algorithm also linked to the payment amount to provide a further level of encryption. A tokenised expiry date also requires a second algorithmic decryption to take place at the issuer on receipt of the card details. At 406, a number of digits, i.e., seven to nine digits, are generated using variable combinations depending on the BIN supplied from the numeric token and expiry date. At 408, the digits are combined with the BIN number, and at 410, a final digit is added for Luhn algorithm compliance. At 412, a card security code (CV2) is generated independently from the payment amount. All of the calculated and encrypted fields can then be included in the payment details. Subsequently, the OTP card can be used, particularly when combined and verified according to one or more biometric analysis features.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, by a computer processor via a communication network, a request for a one-time payment card based on a payment request by a user for making a payment to a merchant over the communication network, the payment having an amount in a proposed currency, the request for the one-time payment card being initiated from an institution associated with a bank identification number (BIN) that receives the payment request from the user and approves the amount of the payment, the one-time payment card being represented as a virtual card with one-time payment details, wherein the one-time payment card is valid for a duration, the duration based on the amount;
authenticating, by the computer processor, an identity of the user using one or more credentials of the user;
generating, by the computer processor, a first token based on the amount using a first encryption algorithm;
generating, by the computer processor after receiving the amount, and when the first token is generated, a second token, the second token generated based on the amount and based on a second encryption algorithm different than the first encryption algorithm;
generating, by the computer processor, a primary account number (PAN) associated with the user, the PAN being generated at least in part based on the authenticated identity of the user, the first token, and the amount approved by the institution;
generating, by the computer processor, the one-time payment details of the virtual card associated with the one-time payment card, the one-time payment details comprising a card number including the BIN and the PAN, a last digit of the PAN being a check digit for a payment card validation algorithm used by the merchant, the one-time payment details further comprising an expiry date, the amount of the payment, and a card security code (CV2), the CV2 being generated based on the second token; and
sending, by the computer processor via the communication network, the card number, the expiry date, the amount of the payment, and the CV2 to the institution for authorization.

2. The method in accordance with claim 1, wherein the PAN is generated at least in part based on the first token.

3. The method in accordance with claim 1, wherein authenticating the identity of the user includes processing, by the computer processor, biometric data captured from the user by the communication network.

4. The method in accordance with claim 3, wherein the biometric data includes data representing at least one of a facial recognition technique, a voice recognition technique, a fingerprint matching technique, a behavioural biometric technique, computer-based navigation cadence, and/or an iris identification technique.

5. A system comprising:
a computer processor configured to receive, via a communication network, a payment request by a user for making the payment to a merchant over the communication network, the payment having an amount in a proposed currency, the computer processor generating a request for a one-time payment card based on the payment request for the one-time payment card being initiated from an institution associated with a bank identification number (BIN) that receives the payment request from the user and approves the amount of the payment, wherein the one-time payment card is valid for a duration, the duration based on the amount; and
a one-time payment card generating computer or application connected with the computer processor and configured to:
generate the one-time payment card based on the request, the one-time payment card being represented as a virtual card with one-time payment details, the one-time payment card generating computer or application authenticating an identity of the user using one or more credentials of the user,
generate a first token based on the amount using an encryption algorithm,
generate, after receiving the amount, and when the first token is generated, a second token, the second token generated based on the amount and based on a second encryption algorithm different than the first encryption algorithm,
generate a primary account number (PAN) associated with the user, the PAN being generated at least in part based on the authenticated identity of the user, the first token, and the amount approved by the institution,
generate the one-time payment details of the virtual card associated with the one-time payment card, the one-time payment details comprising a card number including the BIN and the PAN, a last digit of the PAN being a check digit for a payment card validation algorithm used by the merchant, the one-time payment details further comprising an expiry date, the amount of the payment, and a card security code (CV2), the CV2 being generated based on the second token, and
transmitting electronically the one-time payment details being to the computer processor for authorization of the payment to the merchant using the one-time payment card.

6. The system in accordance with claim 5, wherein the computer processor is associated with the institution.

7. The system in accordance with claim 6, wherein the PAN is generated at least in part based on the first token.

8. The system in accordance with claim 5, wherein authenticating the identity of the user includes processing biometric data captured from the user by the communication network.

9. The system in accordance with claim 8, wherein the biometric data includes data representing at least one of a facial recognition technique, a voice recognition technique, a fingerprint matching technique, a behavioural biometric technique, a computer-based navigation cadence, and/or an iris identification technique.

10. A computer program product comprising a non-transitory machine-readable medium storing instructions that, when executed by at least one programmable processor, cause the at least one programmable processor to perform operations comprising:
receiving, via a communication network, a request for a one-time payment card based on a payment request by a user for making a payment to a merchant over the communication network, the payment having an amount in a proposed currency, the request for the one-time payment card being initiated from an institution associated with a bank identification number (BIN) that receives the payment request from the user and approves the amount of the payment, the one-time payment card being represented as a virtual card with one-time payment details, wherein the one-time payment card is valid for a duration, the duration based on the amount;
authenticating an identity of the user using one or more credentials of the user;
generating a first token based on the amount using a first encryption algorithm;
generating, after receiving the amount, and when the first token is generated, a second token, the second token generated based on the amount and based on a second encryption algorithm different than the first encryption algorithm;
generating a primary account number (PAN) associated with the user, the PAN being generated at least in part based on the authenticated identity of the user, the first token, and the amount approved by the institution;
generating the one-time payment details of the virtual card associated with the one-time payment card, the one-time payment details comprising a card number including the BIN and the PAN, a last digit of the PAN being a check digit for a payment card validation algorithm used by the merchant, the one-time payment details further comprising an expiry date, the amount of the payment, and a card security code (CV2), the CV2 being generated based on the second token; and
sending, via the communication network, the card number, the expiry date, the amount of the payment, and the CV2 to the institution for authorization.

11. The computer program product in accordance with claim 10, wherein the PAN is generated at least in part based on the first token.

12. The computer program product in accordance with claim 10, wherein authenticating the identity of the user includes processing biometric data captured from the user by the communication network.

13. The computer program product in accordance with claim 12, wherein the biometric data includes data representing at least one of a facial recognition technique, a voice recognition technique, a fingerprint matching technique, a behavioural biometric technique such as unique computer-based navigation cadence, and/or an iris identification technique.

14. The method in accordance with claim 1, the method further comprising:
decrypting one-time payment card data to confirm linkage between the amount, the expiry data, and the card number; and
approving, in response to confirming linkage, the payment to the merchant.

15. The system in accordance with claim 5, wherein the computer processor is further configured to:
decrypt one-time payment card data to confirm linkage between the amount, the expiry data, and the card number; and
approve, in response to confirming linkage, the payment to the merchant.

16. The computer program product in accordance with claim 10, wherein the operations further comprise:

decrypting one-time payment card data to confirm linkage between the amount, the expiry data, and the card number; and approving, in response to confirming linkage, the payment to the merchant.

\* \* \* \* \*